UNITED STATES PATENT OFFICE.

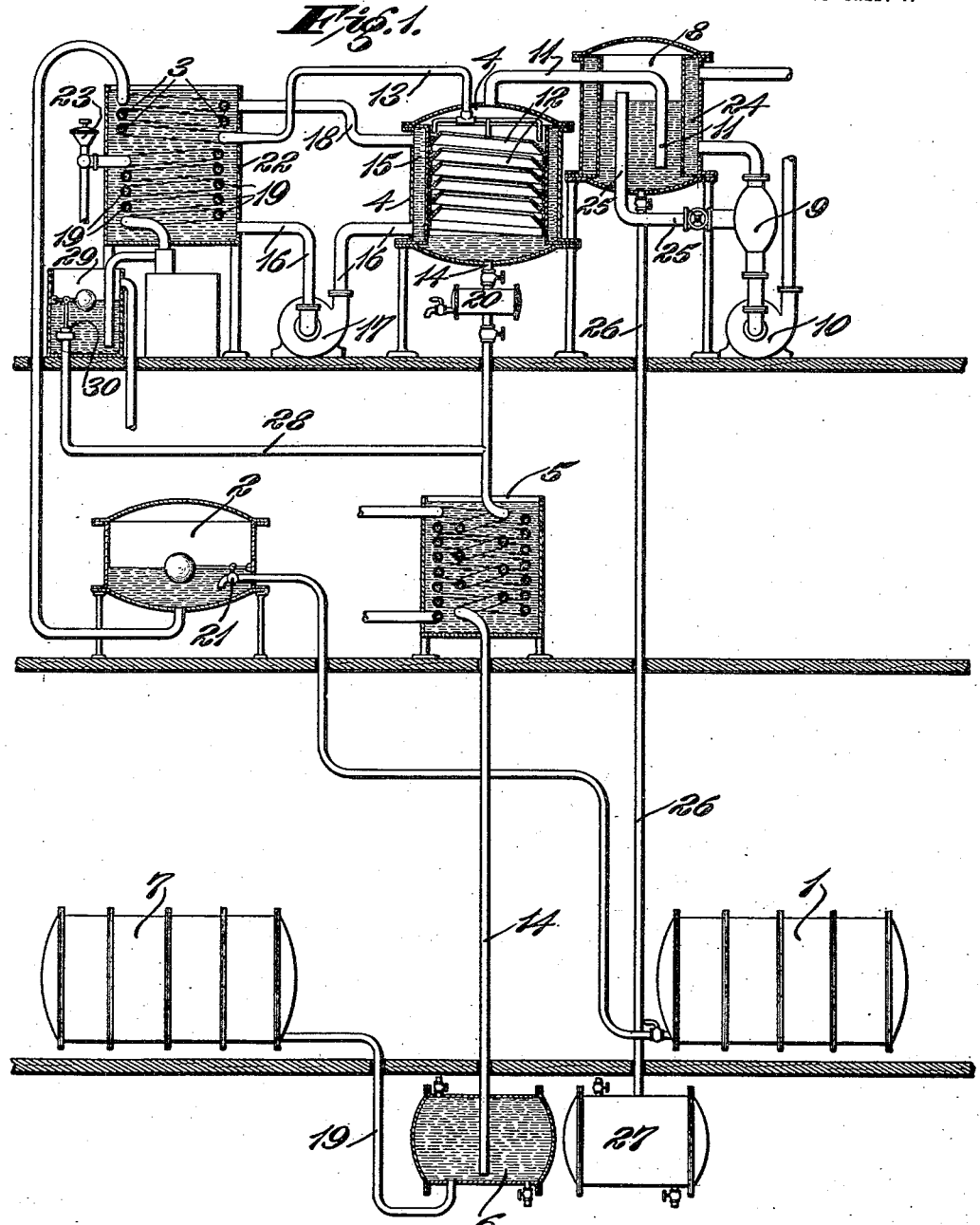

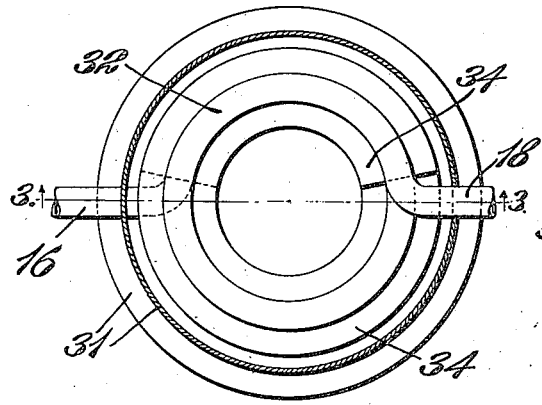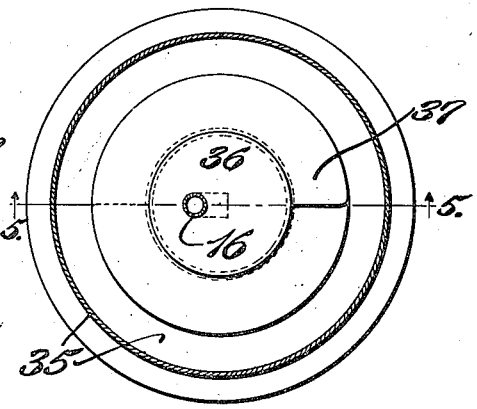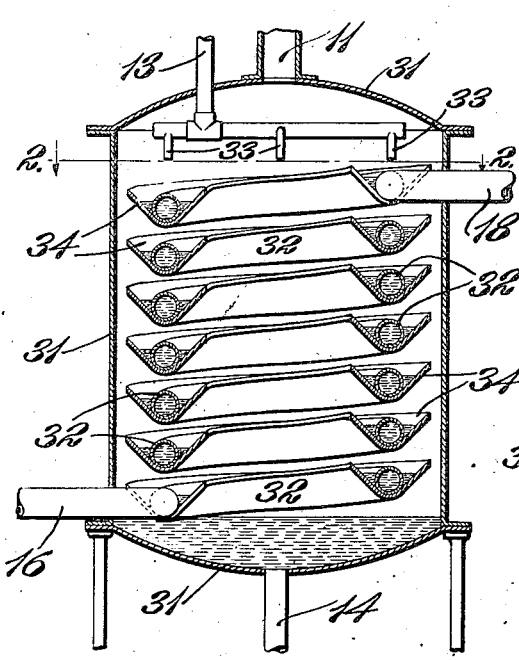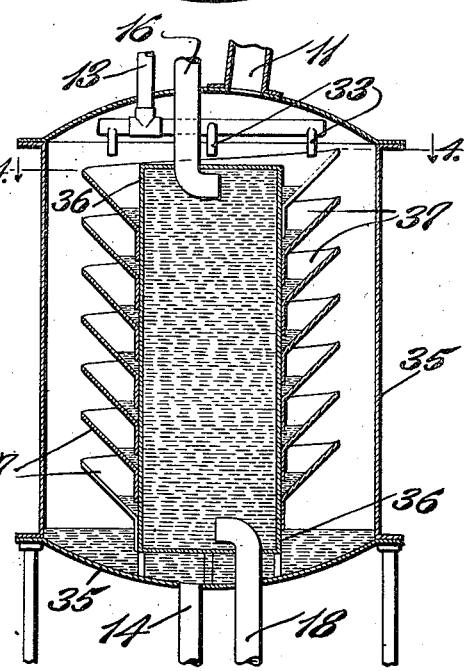

WILLIAM KOEDDING, OF ST. LOUIS, AND WILLIAM J. LEMP, OF COUNTY OF ST. LOUIS, MISSOURI.

APPARATUS FOR TREATING LIQUIDS.

1,351,522.  Specification of Letters Patent.  Patented Aug. 31, 1920.

Application filed April 14, 1917. Serial No. 162,046.

*To all whom it may concern:*

Be it known that we, WILLIAM KOEDDING, a citizen of the United States, and a resident of the city of St. Louis and State of Missouri, and WILLIAM J. LEMP, of the county of St. Louis and State of Missouri, have invented new and useful Apparatus for Treating Liquids, of which the following is a specification.

Our invention relates to apparatus for treating liquids by heat at less than atmospheric pressure, and has for its principal objects to provide for continuity of operation, to effect the treatment at a suitable temperature, to insure the maintenance of a proper degree of vacuum, to provide for supporting the foamy portion of the liquid in proper relation to the main stream of liquid undergoing treatment, to provide for the liberation of the vaporized portion of the liquid from the foam formed above the main stream of liquid as well as from the main stream itself, and to replace part or all of any water that may be lost by distillation.

The accompanying drawings illustrates an apparatus embodying a preferred form of the invention, as more fully described hereinafter. What is claimed as the invention appears in the appended claims.

In the drawings, wherein the same reference characters indicate the same parts in the several views, Figure 1 is a general view of the apparatus, showing it partly in elevation and partly in vertical section;

Fig. 2 is a horizontal section of a modified form of evaporating tank, on the line 2—2 in Fig. 3;

Fig. 3 is a vertical section of the same on the line 3—3 in Fig. 2, the inlet and outlet pipes being shown in elevation;

Fig. 4 is a horizontal section of another form of evaporating tank, on the line 4—4 in Fig. 5; and Fig. 5 is a sectional view similar to Fig. 3 of the tank shown in Fig. 4, on the line 5—5 in Fig. 4.

The liquid to be treated passes from a main reservoir 1 to a float-controlled feed tank 2, from which it passes through a preheater coil 3 to an evaporating tank 4, thence through a brine tank 5 to a collecting tank 6, and thence to a storage tank 7. These several elements, together with a surface condenser 8, an ejector condenser 9 and a centrifugal suction pump 10, arranged to maintain a high degree of vacuum in the evaporating tank, are the main elements of the apparatus. Their connections and method of operation, together with a number of secondary elements associated therewith, are hereinafter described.

The evaporating tank 4 comprises a shell, whose upper portion communicates by a pipe 11 with the surface condenser 8 which in turn is connected to the suction apparatus which is adapted to maintain a fairly high degree of vacuum in the evaporating chamber. Under ordinary conditions, the apparatus enables the vacuum to be maintained at a pressure corresponding to from twenty-two to twenty-nine inches of mercury. Inside of the evaporating chamber is a helical trough or runway 12 of great length and slight longitudinal inclination. In the construction illustrated in Fig. 1 of the drawings, this trough comprises a helical strip or coil of sheet metal which is secured along its outer margin to the inner wall of the evaporating chamber and inclines upwardly to its inner margin. For treating beer and like liquids which foam considerably in the evaporating chamber, the trough or runway therefor should be wide enough and deep enough to accommodate the foam as well as the body of the liquid; and as some of the evaporated alcohol is trapped by the foam, the treatment should be long enough to permit the alcohol to be liberated therefrom. For these reasons it is desirable that the channel for the liquid should have only a slight downward inclination longitudinally so as to insure a slow current and thereby prolong the exposure of the liquid to the action of heat and vacuum and allow time for the foam to be reconverted into liquid form.

At the upper end of the runway is a supply pipe 13 through which the liquid enters the evaporating tank 4, and at the bottom of the tank is the outlet pipe 14 by which the liquid is discharged. The heat is supplied by means of a water jacket. For this purpose, the wall of the evaporating tank 4 is made hollow to form an annular chamber 15. Entering this annular space tangentially near the bottom thereof, is an inlet pipe 16 which leads thereto from the water heater tank 22 through a pump 17. The outlet for this hot water from the annular chamber of the evaporating tank 4 is through a pipe 18 arranged tangentially near the top of said annular chamber, which pipe leads back to said water heater tank 22.

The outlet pipe 14 for the evaporating tank 4 extends downwardly and opens into the collecting tank 6; and this collecting tank 6 communicates through a pipe 19 with the storage tank 7. In order that the liquid may drain properly from the evaporating tank, the vertical distance from the top of the storage tank to the bottom of the evaporating tank is made thirty-three feet or more; and the collecting tank is located at a lower level than the storage tank.

In its passage from the evaporating tank 4 to the collecting tank 6, the liquid passes through a small chamber 20 which can be easily tapped for test purposes. The liquid also passes through the brine tank 5, where it is cooled almost to the freezing temperature.

The feed of the liquid to the evaporating tank is controlled automatically. For this purpose, the liquid in the feed tank 2 is kept at a pre-determined level by means of a float-controlled inlet valve 21, the feed tank being continuously replenished from the main supply reservoir 1 by gravity, air pressure or other suitable means. From the float-controlled tank 2, the liquid is drawn by suction into the evaporating tank 4. So long as the level of the liquid in the tank 2 remains constant and the degree of vacuum in the evaporating tank remains constant, the liquid will be delivered into the evaporating tank in a continuous stream of constant volume, which may be adjusted to the capacity of the apparatus.

In passing from the float-controlled tank 2 to the evaporating tank 4, the liquid passes through the pre-heater coil 3 which is immersed in the heated water of the water heater tank 22. The apparatus is preferably so designed and operated that the liquid enters the evaporating chamber at a temperature in the neighborhood of that at which the liquid will evaporate at the degree of vacuum maintained in said evaporating chamber. The water used for transmitting heat to effect preheating and evaporation is itself heated by a steam coil 19 suitably controlled by a thermostat 23.

For the purpose of de-alcoholizing beer, satisfactory results are obtained with a temperature in the water jacket in the neighborhood of one hundred and ten degrees Fahrenheit, but this temperature admits of wide variation short of impairing the liquid. It is desirable to maintain as high a degree of vacuum as practicable, say about twenty-eight inches of mercury; but the degree of vacuum also admits of considerable variation. The temperature specified is low enough to prevent impairing the organic matter; and with the high degree of vacuum mentioned, there will be rapid foaming and ebullition of the liquid in the evaporating chamber. Assuming that the total length of the helical trough or channel in the evaporating tank or vacuum chamber 4 is in the neighborhood of four hundred feet with a fall of about four feet, practically the whole alcohol content of the beer will be eliminated in the passage through the evaporating tank 4 under the conditions mentioned. The length and slight downward slope of such a channel insure a sufficient prolongation of the exposure of the liquid to the action of heat and vacuum not only to evaporate the alcohol therefrom but also to allow the alcohol trapped in the foam to become liberated therefrom. Thus, there is a main stream of liquid which is being continuously replenished along the channel by the breaking of the relatively stationary bubbles above the main stream. From time to time, a small quantity of the treated liquid may be drawn off from the testing chamber for the purposes of test. If it is found that the treated liquid still contains too large a proportion of alcohol, the degree of vacuum may be increased, the temperature may be increased, or the flow of liquid may be decreased, to bring them into harmony.

The condenser 8 illustrated in the drawing is a surface condenser of a well-known type. It comprises a tank having an annular water jacket 24, into the upper end of which jacket enters a pipe leading from a suitable source of cold water supply. At the lower portion of this water jacket is the outlet pipe which passes through the ejector-condenser 9 and thence to the centrifugal pump 10. In the side of the ejector-condenser opens a valved pipe 25 which extends through the bottom of the surface condenser 8 and to a pre-determined height in the interior thereof. The suction pipe 11 leading from the evaporating tank 4 extends through the side of the surface condenser 8 and terminates in the lower portion thereof. In the bottom of the surface condenser 8 is a valve delivery pipe 26 which communicates with a suitably arranged collection tank 27. In the apparatus illustrated in the drawing, this collection tank is located on a level thirty-three feet or more below the surface condenser in order to permit the liquid of condensation to run off by gravity.

In the practical operation of the apparatus, a continuous current of cold water is forced through the water jacket of the surface condenser and through the ejector condenser 9. The water is passed also through the pump 10 by which it is forced to any suitable cooling device and open tank, liberating the non-condensable gases and again supplementing the supply of water that feeds the water jacket. A high degree of suction is thus maintained in the pipe that opens into the upper portion of the surface condenser 8, and also a high degree of vacuum in the evaporating tank 4 connected therewith. As the liquid in the evaporating tank 4 is heated above its boiling point for the degree of vacuum therein, it foams and boils vigorously, and the alcohol content thereof is evaporated therefrom. At the same time, however, some of the liquid is evaporated and carried over with the alcohol vapor into the cool condensing chamber, where the condensible portions are condensed and accumulate in the lower portion of the tank, whence they are drawn off and the valuable portions thereof recovered directly or by further treatment. The uncondensed gases pass out through the ejector condenser.

The water evaporated from the liquid may be made good by means of a pipe 28 leading from any suitable source of water supply, preferably distilled water. In the apparatus illustrated, the outlet of the steam pipe 19 of the water heater tank 22 opens into a tank 29; and the water in this tank, due to the condensation of the steam, is kept at a constant level by means of a float which controls a valve 30 in the discharge pipe therefrom, which discharge pipe opens through the pipe 28 into the main discharge pipe 14 above mentioned. Broadly speaking, this contrivance restores to the liquid an amount of water fairly equivalent to that lost by evaporation; but it is not claimed that the amount restored to the liquid is accurately equal to the amount lost by evaporation.

The evaporating tank 31 illustrated in Figs. 2 and 3 has a spiral trough 32 in it into the upper end of which the liquid is conducted through branch pipes 33 from the pipe 13. The trough and liquid therein is heated by means of a spiral pipe 34 which is arranged in the trough and through which hot water or steam is circulated by means of the pipes 16 and 18 which communicate with its ends. The top of the tank 31 is fitted with an outlet pipe 11 for vapors; and the bottom of the tank has an outlet pipe 14 for liquids.

The evaporating tank 35 illustrated in Figs. 4 and 5 has an inner upright cylinder or closed receptacle 36 around which a spiral trough 37 is arranged. The liquid to be treated is conducted into the upper end of the trough through branch pipes 33 from the pipe 13, and flows out of the bottom of the spiral into the bottom of the tank, whence it may be drawn off through the pipe 14. Water or steam is circulated through the cylinder 36 by means of the pipes 16 and 18 which open into its upper and lower ends.

A pipe 11 is provided at the top of the tank through which the vapors may be drawn off into a suitable condenser.

The apparatus is not restricted to treating beer, but is applicable to general evaporation uses.

We claim the following as our invention:

1. An apparatus for treating liquids comprising an evaporating tank having an open helical trough therein, and an annular chamber constituting a water jacket, a water heater tank and pipes connecting said water jacket and said water heater tank, and a pump for circulating water through said jacket, a suction device connected to said evaporating tank, means for delivering liquid on to the upper portion of said trough, said means comprising a pipe operatively connected to a source of supply of the liquid and to said trough and containing a pre-heater coiled in operative relation to the water heater to substantially equalize the temperature of the liquid entering said evaporating tank with the temperature of the water in said jacket, and means for removing the liquid from the lower portion of said tank.

2. An apparatus for treating liquids comprising an evaporating tank having an open helical trough therein, and an annular chamber constituting a water jacket, a water heater tank and pipes connecting said water jacket and said water heater tank, and a pump for circulating water through said jacket, a suction device connected to said evaporating tank, means for delivering liquid on to the upper portion of said trough, said means comprising a pipe operatively connected to a source of supply of the liquid and to said trough and containing a pre-heater coil in operative relation to the water heater to substantially equalize the temperature of the liquid entering said evaporating tank with the temperature of the water in said jacket, and also containing a valve for coöperating with the suction in regulating the flow of liquid therethrough, and means for removing the liquid from the lower portion of said tank.

3. An apparatus for treating liquids comprising an evaporating tank having a water jacket surrounding it and an open helical V-shaped trough therein formed on the wall thereof opposite said water jacket, a suction device connected to said evaporating tank, a reservoir for the liquid to be treated located lower than the top of the evaporating tank, a pipe extending from said reservoir and opening onto the upper portion of said trough and having a valve for coöperating with the suction to regulate the feed of the liquid, and means for removing the liquid from the lower portion of said tank continuously without affecting the degree of vacuum in said chamber, said removing means comprising a collection tank located about thirty-three feet or more below the evaporating tank and a pipe extending from the bottom portion of said evaporating tank to said collection tank.

4. An apparatus for treating liquids comprising a water jacketed evaporating tank having an open helical V-shaped trough formed on the wall thereof opposite said jacket, means outside of said jacket for heating and circulating heated water through said jacket, a suction device connected to said evaporating tank, means for delivering liquid on to the upper portion of said trough, and means for removing the liquid from the lower portion of said tank.

5. An apparatus for treating liquids comprising a water jacketed evaporating tank having an open helical V-shaped trough formed on the wall thereof opposite said jacket, means outside of said jacket for heating and circulating heated water through said jacket, a suction device connected to said evaporating tank, means for delivering liquid on to the upper portion of said trough, and means for removing the liquid from the lower portion of said tank, a surface condenser in the suction system and means for draining off the liquid condensed in said condenser.

6. An apparatus for treating liquids comprising a water jacketed evaporating tank having an open helical V-shaped trough formed on the wall thereof opposite said jacket, means outside of said jacket for heating and circulating heated water through said jacket, a suction device connected to said evaporating tank, means for delivering liquid on to the upper portion of said trough, and means for removing the liquid from the lower portion of said tank, and an ejector condenser operatively connected to said evaporating tank.

7. An apparatus for treating liquids comprising a water jacketed evaporating tank having an open helical trough formed on the wall thereof opposite said jacket, a water tank outside of said jacket but communicating therewith, means for heating water in said tank, and means for circulating the heated water through said jacket, a suction device connected to said evaporating tank, a pipe system adapted to deliver liquid on to the upper portion of said trough and having a portion exposed to the heating action of the water in said tank, and means for removing the liquid from the lower portion of said tank.

Signed at St. Louis, Missouri, this twelfth day of April, 1917.

WILLIAM KOEDDING.
WILLIAM J. LEMP.